Oct. 30, 1956    G. R. TREVENNA    2,768,825
MACHINES FOR MAKING POLISHING BUFFS
Filed May 8, 1951    8 Sheets-Sheet 1

GEORGE R. TREVENNA
INVENTOR

BY Wenderoth Lind Ponack
ATTORNEYS

Oct. 30, 1956  G. R. TREVENNA  2,768,825
MACHINES FOR MAKING POLISHING BUFFS
Filed May 8, 1951  8 Sheets-Sheet 2
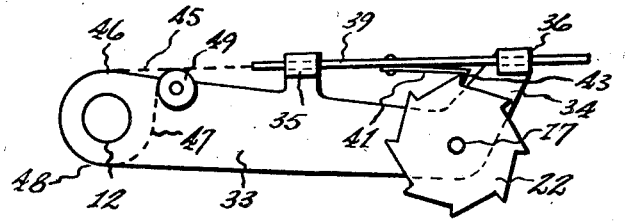
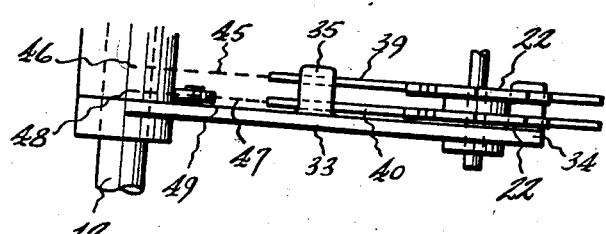
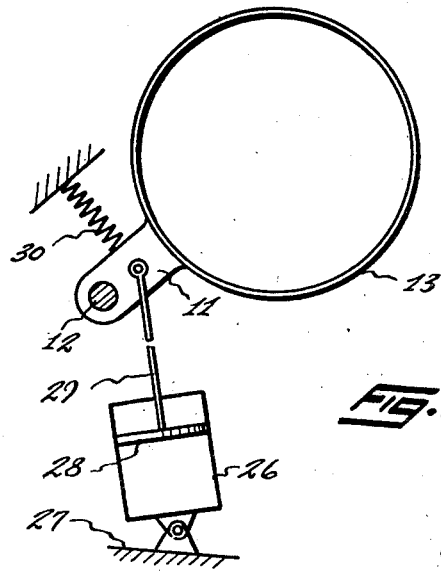
GEORGE R. TREVENNA
INVENTOR
ATTORNEYS

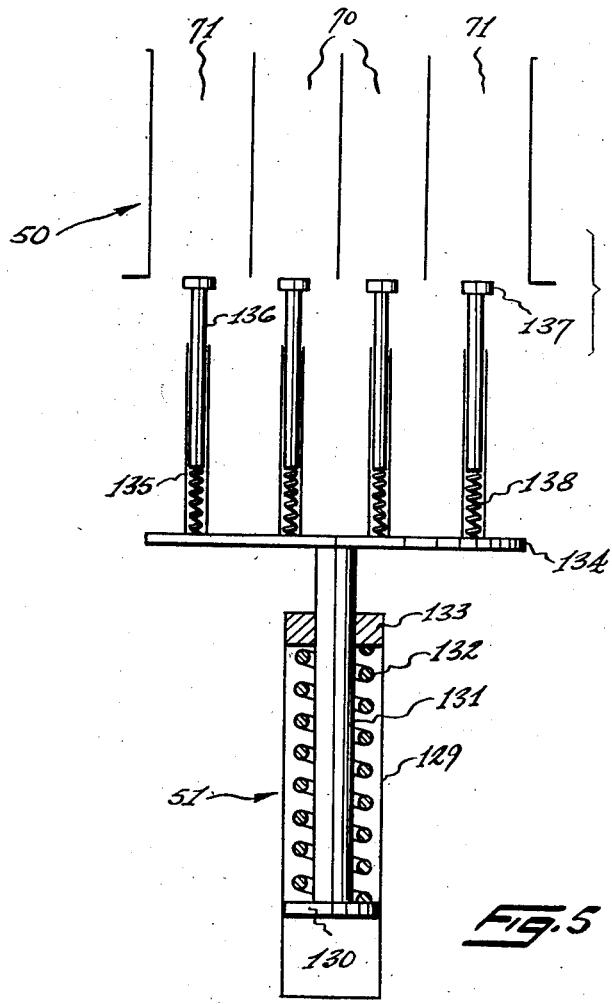
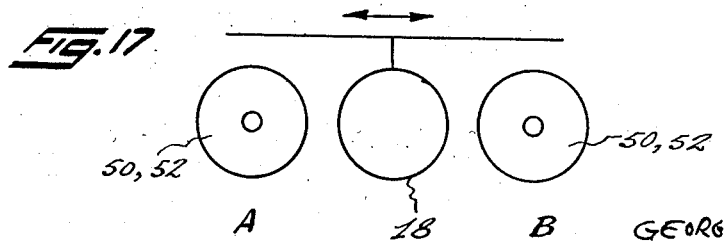

Oct. 30, 1956  G. R. TREVENNA  2,768,825
MACHINES FOR MAKING POLISHING BUFFS
Filed May 8, 1951  8 Sheets-Sheet 4
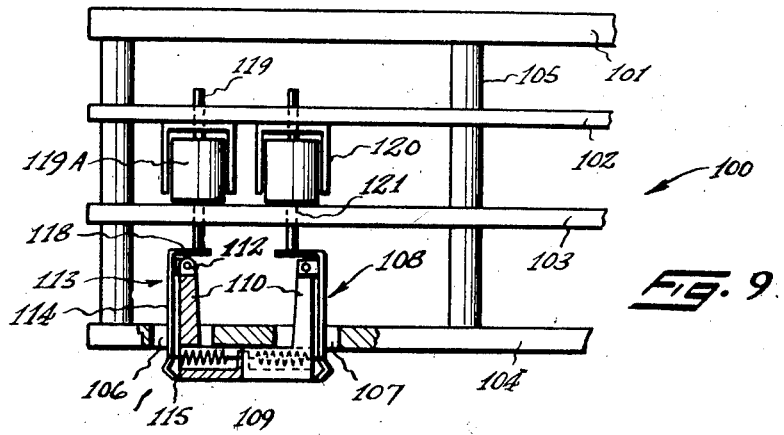
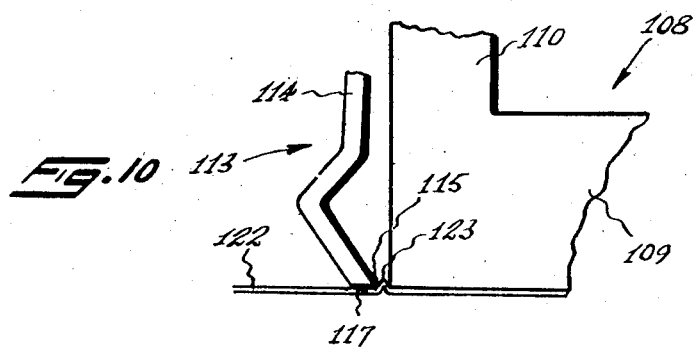
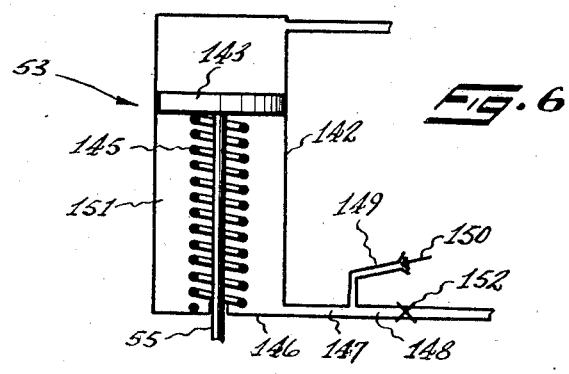
GEORGE R. TREVENNA
INVENTOR
BY Wenderoth Lind & Ponack
ATTORNEYS

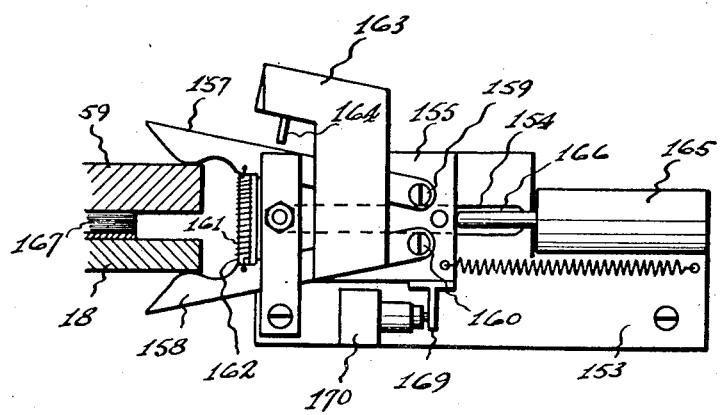
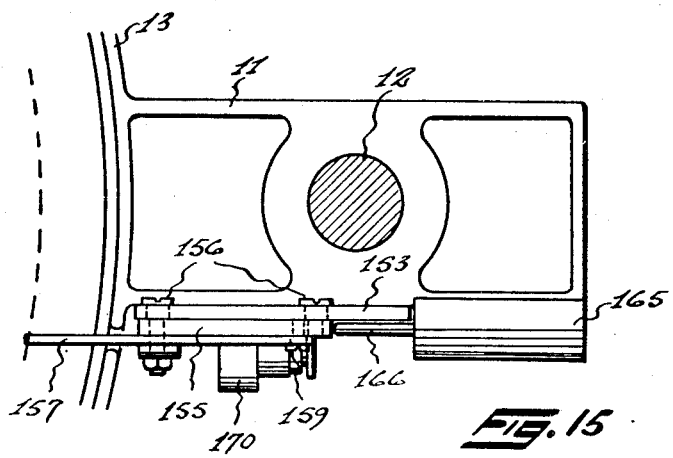
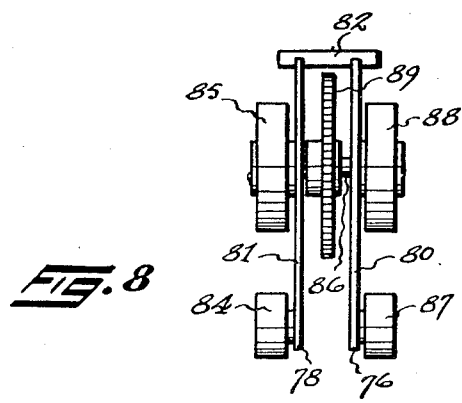

Oct. 30, 1956  G. R. TREVENNA  2,768,825
MACHINES FOR MAKING POLISHING BUFFS
Filed May 8, 1951  8 Sheets-Sheet 6

GEORGE R. TREVENNA
INVENTOR

BY Wenderoth Lind & Ponack
ATTORNEYS

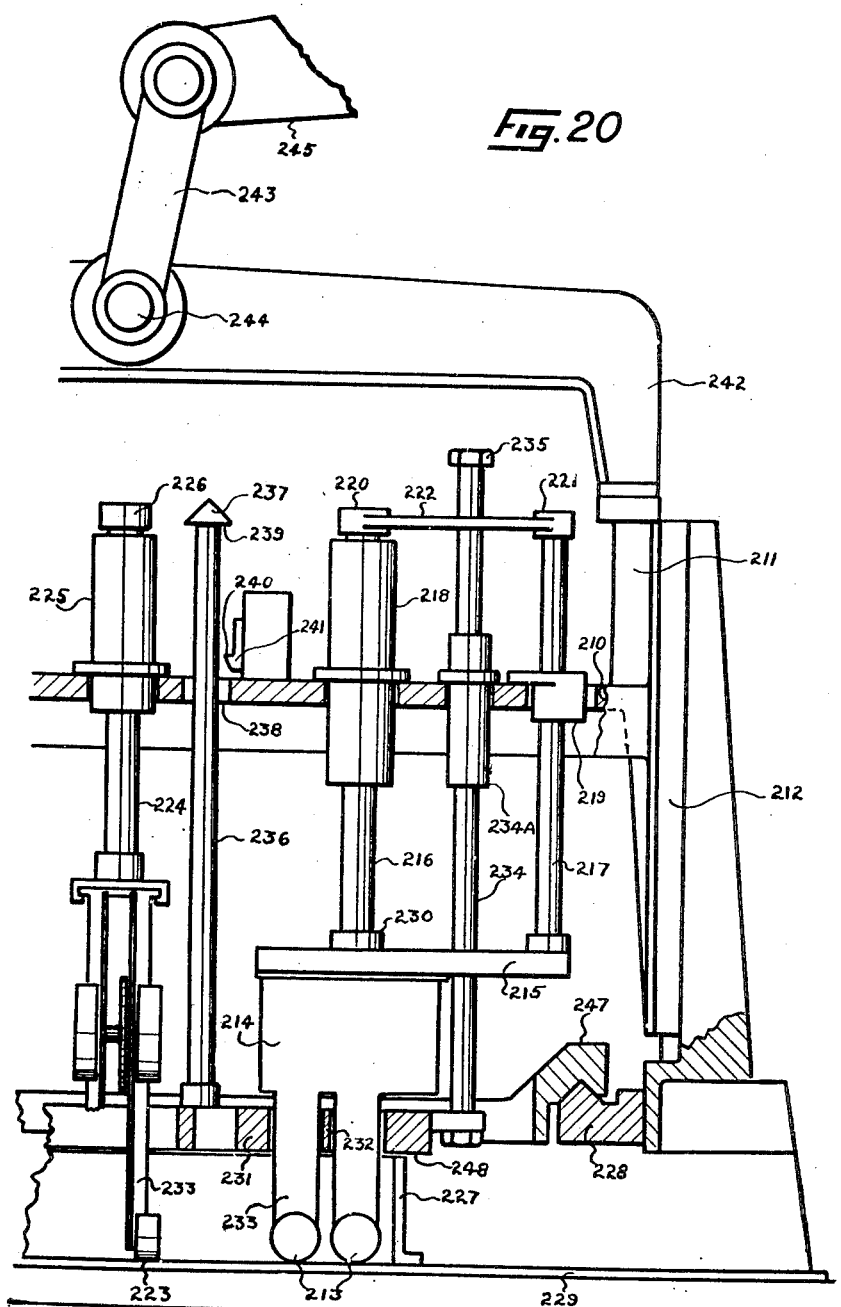

United States Patent Office 2,768,825
Patented Oct. 30, 1956

2,768,825

MACHINES FOR MAKING POLISHING BUFFS

George Roy Trevenna, Chatswood, Sydney, New South Wales, Australia

Application May 8, 1951, Serial No. 225,132

Claims priority, application Australia May 17, 1950

16 Claims. (Cl. 270—58)

This invention relates to polishing buffs or wheels of the type comprising a series of similar discs of fabric or cloth secured together and adapted to be secured to a rotatable shaft or spindle.

Such buffs are normally manufactured from pieces of cloth, e. g. tailors' waste cuttings, varying considerably in size and shape.

Suitable materials other than cloth, e. g. leather, plastic or stiff paper may be used instead of cloth and, for simplicity, the word "cloth" wherever used in the specification and claims is to be interpreted as meaning any suitable material.

The pieces of cloth are usually placed by hand on a flat surface to form one layer, the pieces being selected and fitted together side by side to form a substantially continuous surface. Successive layers are built up in a similar way until the required buff thickness is achieved. End layers, each comprising a one-piece disc, are secured to the respective faces of the assembled buff. The layers are then compressed, cut to a circular shape and stitched to secure them together. The buff is then apertured centrally and provided with a hub, e. g. of two similar apertured leather discs located at the respective ends of the wheel aperture, and nailed or riveted to each other and to the buff.

Although the cloth cuttings used are inexpensive, the labour costs in manufacturing the buff are excessive.

Another disadvantage of such buffs is that part of the rim of the buff may comprise small pieces of cloth which become detached in use. The rim has then to be reduced in diameter to keep its diameter uniform.

Furthermore, buffs constructed as above are difficult to balance dynamically and, owing to the high speed at which the buff rotates, heavy vibrations are set up by an unbalanced one.

The principal object of the invention is to cheapen production costs by providing mechanical means for assembling the component layers of a buff.

Another object is to provide a buff substantially free from the disadvantages of existing buffs.

The invention in one general form is a polishing buff comprising superimposed layers of cloth secured together, each layer comprising one or more flat strips of cloth arranged to form together a layer of the required size, the junction lines between the strips of each layer being offset relative to those of one or more other layers.

Usually each layer will be circular and made up of an inner and an outer ring, coaxial with the buff centre, the cloth strips or sectors in each ring being similar to each other in size and shape.

The inner ring may extend substantially to the buff centre and may comprise a single disc but the term "ring" where used in the specification and claims, is intended to include not only a surface having an inner boundary of substantial radius but one in which the inner radius is negligible or zero, i. e. a disc. Similarly the reference to strips or sectors of each ring is intended to include the case where the "ring" is a single piece of cloth.

As shown by the general statement of the invention, the sectors of each ring may be of varying sector angles but the sector angle of any one sector should be a multiple of the smallest sector angle. There may be more than two rings in each layer.

Another general form of the invention is a machine for assembling buffs as described above and comprising one or more magazines, each adapted to contain a packed series of layers of cloth, each layer adapted to form part at least of one layer of a complete buff and means for removing partial or complete layers from one or more magazines in a desired order and depositing successive layers on each other in that order.

Several forms of the invention will now be described with reference to the accompanying drawings wherein:

Fig. 2 is a diagrammatic view of mechanism for rotating a buff table between two pickup and depositing stations;

Fig. 3 is a diagrammatic plan view of ratchet mechanism for partly rotating the table of Fig. 1;

Fig. 4 is an elevation corresponding to Fig. 3;

Fig. 5 is a diagrammatic sectional elevation of a magazine and an associated ram;

Fig. 6 is a diagrammatic sectional elevation of a pickup head ram;

Fig. 8 is a side elevation of part of a pickup unit of Figs. 1 and 7;

Fig. 9 is a diagrammatic elevation of another form of pickup head;

Fig. 10 is a detail of a pickup foot of Fig. 9 on an enlarged scale;

Fig. 14 is a side elevation of buff thickness gauging means;

Fig. 15 is a plan corresponding to Fig. 14;

Fig. 17 is a diagrammatic plan of an alternative form of machine according to the invention;

Fig. 20 is a fragmentary sectional elevation of an alternative form of pickup head.

Figure 1:
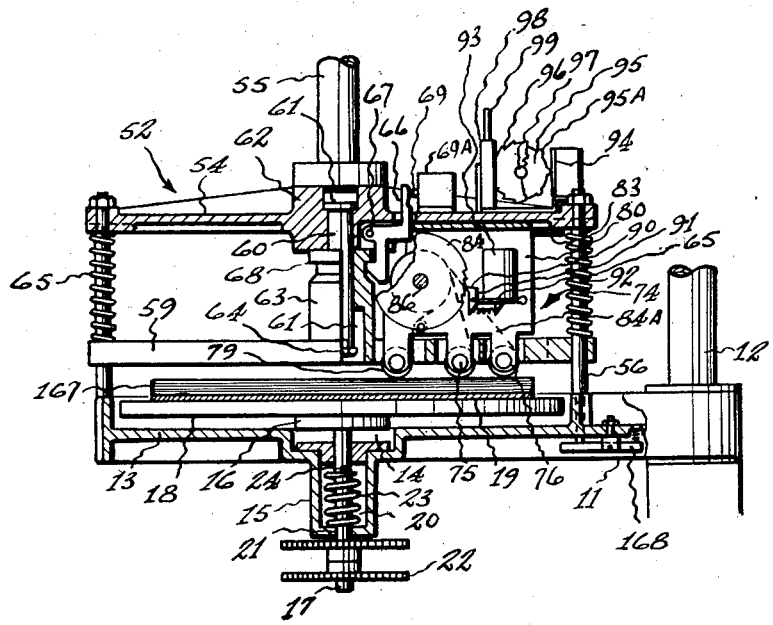
Fig. 1 is a fragmentary sectional elevation of a pickup head, buff table and associated components forming part of a machine according to the invention. Some components have been omitted for clarity.

Referring first to Fig. 1 a short horizontal radial arm 11 is rotatably mounted on a fixed vertical post 12 and has a shallow cylindrical tray 13 on its outer end. The tray has a central recess 14 and an apertured boss 15 to receive respectively a disc 16 and a rod 17, on the upper end of which the disc 16 is secured. A buff table 18 is secured centrally on the disc 16 and a sponge rubber pad 19 is secured centrally on the table. A central locating pin may be secured on top of the table 18.

The rod 17 passes through an internal recess 20 in the boss 15 and through an aperture 21 in the lower end of the boss. Spaced narrow ratchet wheels 22 or a single ratchet wheel are secured on the lower end of the rod.

A helical spring 23 surrounds the rod 17 in the recess 20 between a cross pin 24 through the rod and the lower end of the recess. Downward movement of the table 18 from the normal position, which is that shown, is cushioned by the spring 23.

Means (Fig. 2) are provided for oscillating the arm 11 horizontally about 12 between two extreme positions. The means comprise a cylinder 26 secured at one end to an abutment 27, a piston 28 slidable in the cylinder, a piston rod 29 connected at one end to the piston and at the other end to the arm 11 and means for feeding compressed air when required to one or both sides of the piston. If a single acting cylinder is employed, a return spring 30 is used to bring the arm back from one extreme position. Stops are provided to ensure that the arm 11 does not move beyond its correct extreme positions which are over the respective magazines and below the respective pickup heads to be described later.

Means (Figs. 3 and 4) are also provided for rotating the table through a predetermined angle during each half oscillation. These comprise an underneath arm 33 secured to and rotating with arm 11 on the post 12 and apertured to receive the rod 17, an extension 34 of the arm 33, an upper pair of spaced apertured lugs 35, 36 secured to 33 and 34, a lower pair of lugs secured to 33 and 34 under 35 and 36 respectively, two rods 39 and 40 slidable through the upper and lower lugs respectively, and leaf springs 41, with end pawls 43, secured to the rods 39 and 40 respectively. The pawls 43, are adapted to engage the peripheries of the ratchets 22. A chain or tie 45 is secured at one end to the post 12 at 46 and the other end is secured to the end of the rod 39. A second tie 47 is secured at one end to 12 at 48, diametrically opposite 46, passes around a guide 49 secured to 33 and is connected at its other end to 40.

Rotation of the arm 11 about 12 in one direction loosens the tie 45, tightens 47 and displaces the rod 40 and its pawl towards 12 to partly rotate 22, 17 and the buff table 18. Rotation of 11 in the opposite direction loosens 47, tightens 45 and rotates 18 in the same direction as before. Springs are provided to displace 39 or 40 away from 12 when their respective ties slacken.

Associated with the post 12, arms 11 and table 18 are two lifting and depositing stations located respectively at equal distance from 12 and at the ends of the path of movement of 11 and 18 about 12.

Each station includes a lower fixed magazine 50 (Fig. 5), a magazine ram 51 below the magazine, an upper vertically reciprocable pickup head 52 (Fig. 1) and a pickup ram 53 (Fig. 6) above the pickup head.

The pickup head includes a head plate 54 secured on the lower end of the piston rod 55 of the ram 53. Spaced rods 56 secured to and depending from the head plate are located above holes 57 in lugs 58 integral with a stripper grid plate 59.

A headed bolt 60 is located in a counterbore 61 in a central boss 62 of 54. A central upward boss 63 on the stripper plate 59 is apertured and counterbored and slidably mounted on the bolt 60. A stud 64 on the end of 60 limits downward movement of 59. A helical spring 65 surrounds each rod 56 between 54 and 59. A latch lever 66 is pivoted at 67 on the boss 62 and is spring or gravity biased as shown to engage a shoulder 68 on the boss 63 and retain the plate 59 in the upward position shown when it is displaced to that position against the springs 65. Means, e. g. a plunger 69 slidable in a ram cylinder 69A, are provided for unlatching 66 from 63 and 59 when required.

Each magazine 50 is divided into compartments and feet are secured to the plate 54 and are adapted, when 54 is lowered, to engage the upper strips of cloth in the respective magazine compartments.

A typical magazine (Fig. 7) has two rings of compartments 70, 71 as shown. For each inner compartment 70, two corresponding stripper plate apertures 72 are provided and for each outer compartment 71 two stripper plate apertures 73 are provided. In the form of the invention shown, the feet are assembled in units 74, each having four outer compartment feet 75, 76, 77, 78 and one inner compartment foot 79 (Fig. 8 also). The upper strip of cloth in any one inner compartment 70 will be picked up and deposited (as described later) by two feet 79, one from each of two adjacent units 74.

The feet are formed on the lower edges of two parallel vertical spaced plates 80, 81 joined at their upper edges to a plate 82 slidably and replaceably supported in channeled guides 83 on and under the head plate 54. The plate 80 has the three fingers 75, 76, 79 formed on its lower edge and 81 has two fingers. Spools of adhesive tape 84A are rotatably mounted on and outside the respective fingers. The tape on the spools 84 mounted on the plate 81 is led to a wind up spool 85 (Fig. 8) secured on a shaft 86 and that on the spools 87 mounted on 80 is led to a windup spool 88 on 86. A ratchet wheel 89 is secured on 86 between 80 and 81. The outer edge of 89 is engaged by a pawl 90 on a lever 91 spring biased to engage 89. The lever 91 is carried by the armature 92 of an electro-magnet 93 in an electric circuit including a microswitch lever 94 normally spring pressed to the open circuit position. The electromagnet 93 is secured to and between the plates 80, 81.

A cam wheel 95 with spaced lifts 95A and a ratchet wheel 96 are secured on a shaft 97 on and above 54. A guide 98 secured on 54 slidably receives a tappet 99 normally pressed upwards by a spring in 98 between the lower ends of 98 and 99. The tappet is notched to engage and rotate 96 when depressed and to ride freely over 96 when raised. A fixed stop (not shown) is adapted to engage and depress 99 and rotate 96, 97, 95 every time the pickup head is raised. The lifts 95A are spaced so that each in turn engages 94 and closes the circuit to 93 after a predetermined even number of upward movements of the head 52 and while no cloth strip is secured to the feet 75 to 79. When the circuit is closed the armature 92, lever 91 and pawl 90 move up to rotate the ratchet 89 and the spools 85 and 88 and bring fresh surfaces of adhesive tape to the lowermost points of the spools 84 and 87.

An alternative but simpler construction of pickup fingers is one in which similar parallel rods secured to the head are substituted for the feet 75 to 79, one or more to each magazine compartment. An amount of adhesive is placed initially on the lower end of each rod. The disadvantage of this arrangement is that there is no provision for replenishment of the adhesive.

Figure 11:
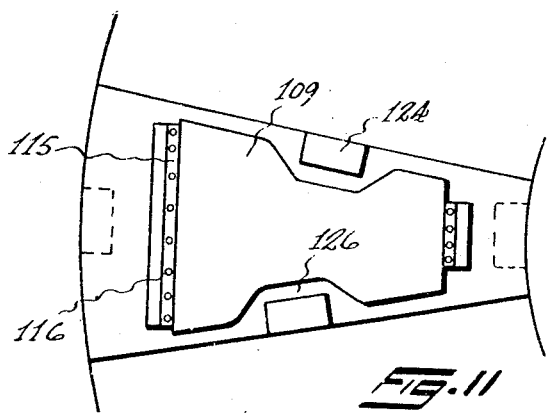
Fig. 11 is an inverted plan of part of a magazine and of the pickup foot of Fig. 10.

In Figs. 9, 10 and 11 is shown a form of pickup head 100 with which no adhesive is employed. It comprises parallel discs 101, 102, 103, 104 connected and spaced by posts 105. The lowermost plate 104 has formed through it paired apertures 106, 107, one pair being located above each magazine compartment. A pickup unit 108 is provided for each pair of apertures. It is secured to the head and extends below the disc 104 and includes a foot 109 shaped in plan to conform with the shape of the corresponding magazine compartment but slightly smaller. Spaced posts 110 are secured to the foot and extend through the apertures 106, 107. Each post has pivotally mounted on it at 112 a bent lever 113. The latter includes a long arm 114 having a lower gripping edge 115 which is normally spring biased against the post. The arm 114 is dimensioned so that its gripping edge 115 is coincident with the lower outer edge of the foot 109. The edge 115 has spaced recesses 116 in its under surface, in each of which is secured a needle 117 which protrudes about .004", which is less than the usual minimum cloth thickness.

Each lever short arm 118 has associated with it an electromagnet plunger 119. The electromagnet 119A is secured to the disc 102 and the plunger 119 is carried by a movable U-shaped armature 102. When the electromagnet is energised the armature is displaced and the plunger 119 moves through an aperture 121 in the disc 103, engages 118 and displaces the edge 115 from contact with the foot 109. This is timed to occur just after a cloth strip is forced against the foot by the magazine ram. The magnet is then de-energised and the edge 115 moves back. As it does so the needles 117 penetrate and ruck the upper cloth strip 122 only as at 123 so that it is gripped between 115 and 109. The head 100 is then raised. When the head next moves down towards the table 18, which meanwhile has moved between it and the magazine 50, the electromagnet 119A is energised when the head 100 is close to the table 18 to move 115 away from 109 and release the cloth.

The magnet 119A remains energised until the head is lifted after depositing the cloth. No stripper plate 59 or adhesive supply is required nor are any of the components associated with supplying adhesive or stripping.

To facilitate the picking up of the upper strip from each compartment, small rubber wedges 124 (Fig. 12) are secured to two opposite magazine compartment walls. Additional wedges 125 may be employed if required.

The wedges resist the upward movement of the packs by the magazine rams and help to break down the adhesion between the upper strip of each compartment and the one below it.

When a pickup foot such as 109 is used it is cut away at 126 to enable it to pass the wedges.

Figure 7:
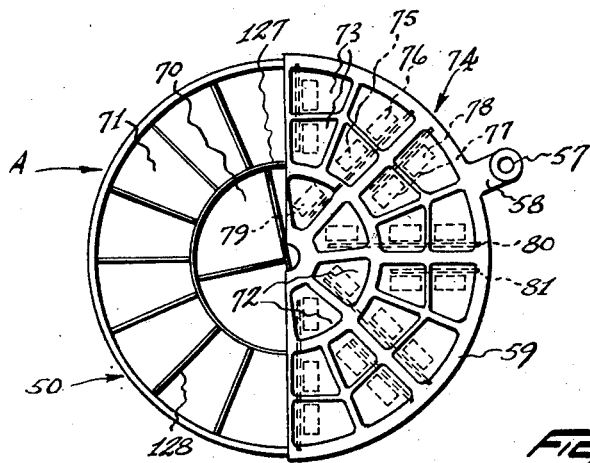
Fig. 7 is a half plan of a magazine and of a stripper plate and other components.

Each magazine 50 is cylindrical, open at top and bottom and divided into rings of compartments 70, 71 by a cylindrical partition 127 (Fig. 7). Each ring is subdivided into compartments by radial partitions 128.

One magazine will have its partition 127 of a different radius from that of the other so that when successive layers of a buff are taken from the magazine in turn the circular joint between the two rings of cloth strips of each buff layer will be staggered radially relative to that of each adjacent layer.

The angular rotation of the buff table which occurs on each half oscillation of the arm 11 ensures that the radial joints of successive buff layers are staggered circumferentially. This angle is normally half that between partitions 128.

The magazine ram 51 (Fig. 5) includes a fixed cylinder 129, a piston 130 reciprocable in the cylinder, a piston rod 131 secured at its lower end to the piston, a return spring 132 surrounding 131 between 130 and a cover plate 133, and a plate 134 secured on the upper end of 131. Spaced vertical similar sleeves 135 are secured at their lower ends to 134 and similar rods 136 with upper end caps 137 are slidably located in the respective sleeves 135. A compensating spring 138 is located in each sleeve between the lower ends of the sleeve and the rod. The sleeves are located under the respective magazine compartments 70 and 71 and each capped rod 136 is adapted to engage and lift all the strips in the associated compartments 70 or 71 when the piston 130 is raised by air pressure against the spring 132. The compensating springs 138 allow for differences in cloth thicknesses and consequent differences in the number of strips in the different compartments of the magazine.

Figure 13:
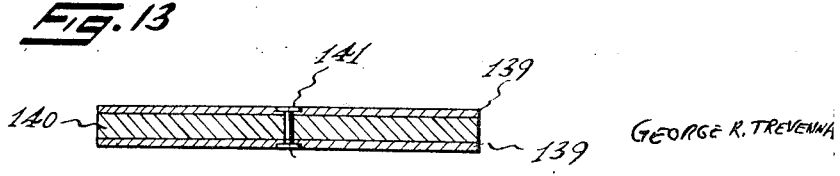
Fig. 13 is a sectional elevation of a floor or platform for supporting cloth strips in a magazine compartment.

The pack of cloth pieces in each compartment is supported on a floor fitting closely but slidably in the compartment. The floor is shown in Fig. 13 and comprises two similar stiff fibre plates 139 with a felt pad 140 between them joined by a metal rivet 141. Each rivet is located so as to be immediately over the cap 137 of the corresponding ram rod 136 and immediately under a metallic feeler attached to one of the pickup feet for the relevant magazine compartment.

The rivet 141, cap 137, rod 136 and feeler are located in an electric circuit which remains open as long as there is a cloth strip in the compartment to separate the rivet and the feeler when the rods 136 are up and the head e. g. 52 or 100 is down. When the compartment is empty, the feeler contacts the rivet 141, closes the circuit and operates means for cutting off the compressed air supply, lighting a warning lamp and stopping the machine.

The pickup head rams 53 (Fig. 6) include components 142, 143, 55, 145, 146 corresponding to 129, 130, 131, 132, 133 respectively only.

On the first half of the pickup movement of the head, the latter must move down further than on the first half of its depositing movement by an amount approximating to the combined buff and table thicknesses. This difference between successive downward movements of the head is achieved in the following manner.

The piston rod 55 fits closely but slidably in the end 146 of the cylinder 142. An air pipe 147 is connected to the cylinder below the piston 143. The pipe has two branches 148, 149. One is partly closed by an adjustable needle valve 150 which allows air from the space 151 to escape very slowly. The other has on it a stop valve 152 which, when open, allows air to escape quickly, from the space 151.

Known means, e. g. a cam on a rotating shaft, are provided and are timed to open the stop valve 152 at the beginning of a pickup downstroke so that the head 52 or 100 moves towards the magazine 50 with its movement cushioned only by the spring 145. On the depositing down stroke, the valve 152 remains closed (it may be spring biassed to do so) and the movement of 143 is cushioned by the spring 145 and by the air in 151 which can only escape slowly through the needle valve. Means are provided for stopping the machine when a buff of desired thickness has been built up (see Figs. 14 and 15).

They include a vertical mounting plate 153 secured on one side of the arm 11 between the post 12 and the tray 13 and provided with a horizontal slot 154. A vertical block 155 is slidably secured to 153 by studs 156 passing through the channel 154 into the block. Spaced gauge caliper arms 157, 158 are pivoted at 159, 160 respectively on the block and are biassed together near their other or jaw ends by a tension spring 161 enclosing a stop rod 162 secured to one of the arms. The stop rod limits the movement of the jaws towards each other. A bracket 163 carrying a microswitch button 164 is secured to the arm 158. A pneumatic cylinder 165 with a plunger 166 slidable in it and adapted to engage the outer end of the block 155 is secured to the mounting plate. When air is fed to the cylinder 165, the plunger 166 displaces the block and the arms towards the stripper plate 59 and the buff table 18 and the arms 157, 158 which are rounded inside of their ends move apart as they move over the respective upper surface of 59 and lower surface of 18. As they do so, the jaws spread against the spring 161. The position of the microswitch button 164 is adjusted so that it is contacted by the arm 157 and the switch closed when the thickness of the buff 167 reaches a predetermined value. The machine then stops.

The air supply to the cylinders 165 and 69A (Fig. 1) comes from a common air supply line on which are two branches leading to the respective cylinders. A solenoid operated valve of the type shown in Fig. 16 and described later is located on the common line between the main compressed air source and the branches leading to 165 and 69A.

On downward movement of the head 52 or 100 on the depositing stroke, a switch 168 (Fig. 1) on the arm 11 is closed by the head and a circuit is thus closed to energise the solenoid and actuate the valve to feed air to 165 and 69A. The supply to 165 is delayed. The movement of the plunger 69 displaces the lever 66 to release the stripper plate 59. After the latter has moved down onto the buff 167, the block 155 and arms 157, 158 are moved across to gauge the buff thickness, and a lug 169 secured to the block 155 actuates a switch 170 fixed to 153 which is in the same circuit as 168 and de-energises the valve solenoid. The valve plunger moves to the exhaust position, allowing the lever 66 to move to the "ready" position, and a spring 171 secured to 153 and 155 with-draws the block.

In a modification there are three branches on the supply line, one leading to cylinder 165 and the other two to the respective cylinders 69A at the pickup and depositing station. Each branch leading to a cylinder 69A has a normally closed stop valve on it and each stop valve is adapted to be opened by the movement of the arm 11 to between the head and magazine at the corresponding station.

Figure 16:
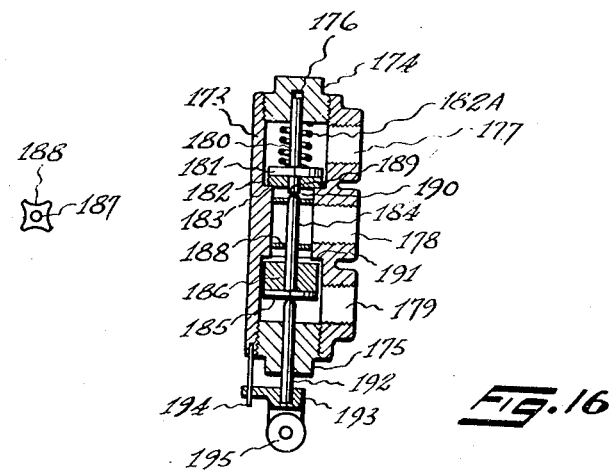
Fig. 16 is a sectional elevation of a combined inlet and exhaust valve associated with a machine according to the invention.

The valves for controlling the admission of compressed air to the respective cylinders 26, 129, 142, 69A, 165, 142 and for exhausting air from the cylinders are preferably of the type shown in Fig. 16. Each cylinder may have its own valve, or where air is to be fed to or exhausted from a group of cylinders e. g. 142 at the same time, a single valve may be used for the group.

Each valve comprises a body 173 having end apertures closed by plugs 174, 175. The plug 174 is internally socketed at 176 and the plug 175 is apertured. Three spaced apertures 177, 178, 179 are formed through the valve body wall between the plugs. A stem 180 with an integral disc 181 and attached washer 182 is slidably located at one end of the valve body with one end of the stem in the socket 176. The washer 182 is biased by a spring 182A against a shoulder 183 to disconnect the upper end of the valve body from the other end. The aperture 177 is connected to the compressed air source.

A second stem 184 carrying a disc 185 and washer 186 is slidably located in apertures 187 in spaced star shaped washers 188. Its upper end engages a recess 189 in the lower end of an end extension 190 of 180 and the washer is normally pressed by the spring 182A away from a shoulder 191.

The aperture 178 leads to the cylinder such as 26 controlled by the particular valve and the aperture 179 is open to the atmosphere.

A tappet 192 is slidably mounted in the aperture in the plug 175. Its inner end engages 185 and its outer end is in a socket in a displaceable forked lug 193 slidable on a guide rod 194 and carrying a roller 195.

Each tappet 192 is moved when required by one of a series of cams secured on a rotating cam shaft or by a solenoid plunger in engagement with 195. Preferably cams are used for the cylinders 26, 129, 142 and solenoid plungers for cylinders 69A, 165. The cams or like means are designed in known fashion to ensure that each tappet is displaced at the correct point in the pickup and depositing sequence.

A sequence of operations will now be described when the pickup head is of the type shown in Figs. 1, 7 and 8 and the table 18 oscillates about 12 between two stations (Fig. 2). As described earlier in column 5, lines 30 to 35 each station includes a magazine 50 and a pickup head 52.

Initially each pickup head is up and its stripper plate 59 down, i. e. unlatched. Each magazine ram piston 130 is down and the packs of cloth strips in each magazine compartment are supported on the respective floors (Fig. 13) and on the respective caps 137.

Air is fed to one pickup head ram cylinder 142, e. g. at one station which will be called X for convenience, and its head 52 moves down. When the associated plate 59 contacts the magazine upper edge it stops. The remainder of the head continues to move down. The feet 75 to 79 pass through the apertures 72, 73 and engage the upper strips in the magazine compartments 70, 71. The strips are forced against the feet by feeding air to the cylinder 129. The upper strips adhere to the tape on the feet. The springs 65 are compressed and the stripper plate boss 63 is latched to 66. Air is then exhausted from the pickup head ram cylinder and the cylinder spring 145 raises the head with the feet below the stripper plate. At the same time air is exhausted from the cylinder 129 and the caps 137 move down. Each floor (Fig. 13) fits so tightly in its magazine compartment that it does not slip down under the weight of a pack of cloth pieces when the caps 137 are withdrawn. The fit is not so tight as to prevent the floor moving upwards when forced upwards by a cap 137.

As the head 52 rises the tappet 99 is depressed and 95 rotated but the lifts 95A are located so that none of them contacts 94 at this stage.

Air is then fed to the cylinder 26 and the tray 13, table 18 and other components are rotated about 12 from their starting position at the second station which will be called Y for convenience to a position against a stop and immediately under the pickup head and above the magazine at X.

After the table 18 leaves Y and reaches X, picking up of a layer of strips from the magazine at Y by the pickup feet at B takes places as occurred earlier at X.

At about the same time air is fed to the pickup head ram cylinder 142 at X and the head 52 is forced down. The feet 75 to 79 force the cloth strips onto the pad 19. As this occurs, one of the rods 56 engages the microswitch 168 on the tray 13 and closes a circuit. As described earlier this energizes means for feeding air to the cylinder 69A to displace the plunger 69 and unlatch the stripper plate 59. Alternatively a plunger displaceable in a solenoid may be substituted for 69 and 69A, the closing of the circuit energizing the solenoid.

The springs 65 force the plate 59 against the cloth strips on 19 but at this stage the inner end of the counterbore 61 in 63 does not reach the stud 64. As described before, air is then fed to the cylinder 165 to displace the gauge caliper arms towards the plate 59 and table 18. After the caliper arms are retracted, air is exhausted from the pickup head ram cylinder and the head 52 rises. The feet 75 to 79 move up through the apertures 70, 71 and are detached from the upper cloth strips since the latter are held on the pad 19 by the plate 59. The pad 19 ensures that the layer is secured firmly between 19 and 59 and any tendency for a strip to be pulled sideways from under 59 and upwards through a stripper plate aperture is counteracted. When the stud 64 reaches the inner end of 61 the plate 59 moves up away from 19 with the head 52.

Air is then exhausted from the cylinder 26 and the spring 30 returns the tray 13 to station Y. The steps of depositing on the table at Y cloth strips previously picked up from the magazine at Y are then carried out. Preferably the two pickup heads are raised and lowered simultaneously, one picking up and the other depositing. They may be secured together and moved by air fed to a single cylinder 142 and controlled by a single valve as in Fig. 16. Alternatively they may be moved independently, air being fed to the separate cylinders 142 and controlled by a single valve or separate valves.

During its movement from X to Y the table 18 is rotated by the ratchet mechanism shown in Figs. 3 and 4 and described earlier. The amount of rotation is made equal to half the angle between adjacent partitions 128 so that when a layer from Y is deposited on one from X or vice versa the radial joints are staggered.

Meanwhile a second layer of strips is picked up at X from the magazine ready to be deposited on the table when it returns from Y.

Although in the above form of the invention the use of an arm 11 oscillating about a post 12 and carrying a table 18 oscillating between two stations X and Y has been described, it will be clear that two or more arms 11 may be mounted on 12, each having two stations X and Y and other components associated with it.

Alternatively the table 18, instead of oscillating between stations X and Y, may be adapted to reciprocate between stations A and B as shown diagrammatically in Fig. 17. A battery of units each unit including two stations A and B, a reciprocating table 18 and associated components may be set up, with the paths of the respective tables 18 parallel and each in line with the associated stations A and B.

Figure 18:
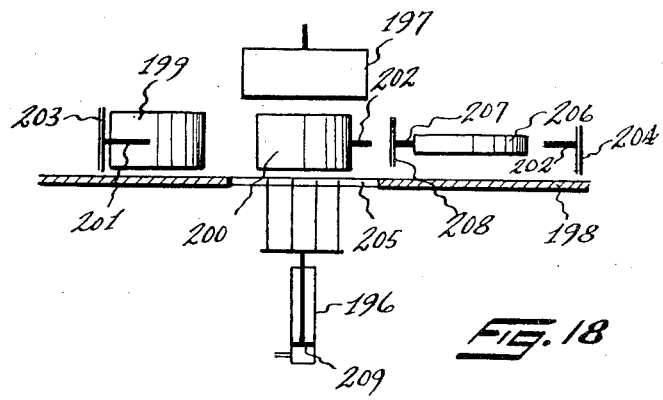
Fig. 18 is a diagrammatic elevation, partly in section, of another form of machine according to the invention.
Figure 19:
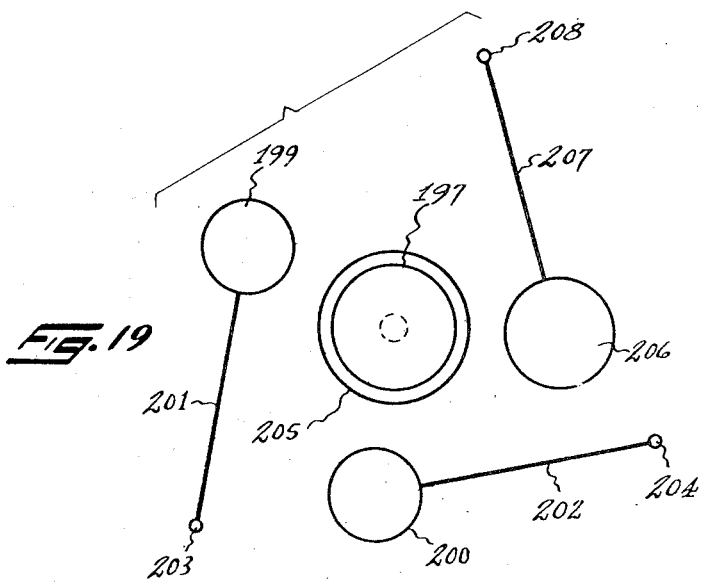
Fig. 19 is a plan corresponding to Fig. 18.

In Figs. 18 and 19 is shown diagrammatically an alternative arrangement in which a magazine ram 196 and a vertically reciprocable single pickup head 197 are located, the head 197 above the ram 196, with an apertured base plate 198 between them. Two magazines 199, 200 having partitions 127 of different radii (in column 3, lines 40 to 60) are mounted on arms 201, 202 rotatably supported on vertical posts 203, 204 and are adapted to be moved in turn, e. g. pneumatically, under the base plate aperture 205 and above the magazine ram 196. A buff table 206 is similarly supported on an arm 207 and post 208 and is adapted to be moved over the base plate aperture 205 and below the pickup head 197 after one magazine has moved away from 205 and before the other magazine moves towards it.

The other components are similar to those already described.

Initially the components are disposed as follows:

The two magazines 199, 200 and the buff table 206 are away from the base plate aperture, the magazine ram piston 209 is down, the pickup head 197 is up and the stripper plate is down, i. e. unlatched from its head plate 54.

A complete cycle of operations involving the picking up of two buff layers from the respective magazines and their deposition on the buff table will now be described.

First air is fed to one magazine arm cylinder and that magazine e. g. 199 is moved over the base plate aperture 205. A stop ensures proper location of the magazine.

Air is then fed to the pick-up head cylinder, so that the pickup head moves down until the upper edge of the magazine prevents further downward movement.

The head plate 54 continues to move down, the feet passing through the stripper plate apertures, until the catch lever 66 engages the stripper plate and retains it in the upper position.

Air fed to the magazine ram cylinder then moves the main ram plate 134 and associated capped pins up. The latter move into the lower end of the magazine and force the upper layers of cloth in the magazine against the pickup head feet.

The compensating springs 138 allow for variation in thickness of the uppermost cloth pieces. The ram then moves down.

The pickup head starts to move up and as it does so a vibrator maybe energised for a short time if required so that cloth pieces, other than the uppermost ones, which may be lifted with the pickup feet are shaken off.

The magazine arm 201 is then rotated to its outer or inoperative position.

The buff table 206 is then moved in over the base plate aperture. A stop locates it correctly. A roller or wheel depending from the arm 207 is located over a microswitch button flush with the base plate surface.

The pickup head moves down, and its feet carrying the cloth pieces press them against the buff table and depress the latter to close the microswitch. Solenoids or the like are energised to operate the catch to release the stripper plate. The stripper plate moves down against the cloth pieces and holds them on the buff table.

The pickup head rises with-drawing the feet from the cloth pieces. The springs as at 65 expand until, when they are fully expanded, the stripper plate rises with the rest of the pickup head.

The buff table is then withdrawn and rotated, when near its outer position, by means of a ratchet wheel, ready for deposition of the next cloth layer. The rotation ensures as before that radial joints of successive buff layers are staggered circumferentially.

The second magazine 200 is then brought over the aperture, its top layer lifted by the pickup head, the magazine removed, the buff table returned and the layer deposited from the pickup head on the layer already on the table. The head is then raised. This completes the cycle.

Although the invention has been described in connection with the manufacture of a buff having only two types of alternating layers it may be desirable to make buffs employing three or more types of layers. Three or more magazines will then be required but the mechanism and operation thereof will be closely analagous to that already described.

It may also be practicable or desirable to make a buff in which all layers are similar and each sector of each layer extends for substantially the full radius of the buff. Radial partitions only will be required in the magazine and only one magazine will be required.

Another important modification of the invention is one in which adjacent strips of each ring of one buff layer overlap. Such a construction can be carried out by a machine as described above by modifying it as follows:

Instead of providing at least one pickup foot for each magazine compartment a pickup foot or feet is or are provided only for every second compartment.

A single magazine may be employed, with an associated pickup head, and a table oscillating between an operative position between the pickup head and the magazine, and a non-operative position. Ratchet mechanism is provided to rotate the table to provide the necessary overlap after the table has received one half layer from the head, moved to the non-operative position and then returned to receive a second half layer from the head.

Alternatively two magazines may be located at spaced stations, the table oscillating between the stations, receiving successive half layers from each station in turn and being rotated as required to provide an overlap between each strip of one half layer and the adjacent strip of the next half layer.

In another modification the magazine rams are dispensed with and rod, sleeve, and spring units as at 136, 135, 138 (Fig. 5) or like units are substituted for the pickup feet described earlier. Each rod, sleeve and spring unit is secured to a head plate such as 54 and the end of the rod carries a pickup foot such as 75 or 109 instead of a cap. Each magazine compartment has a fixed floor and as the packs reduce in size after repeated pickup steps, springs or other means force the rods into the compartments onto the top most strips.

A preferred form of this construction is shown in Fig. 20. This also illustrates a form of pickup head guide not shown in earlier drawings, a form of table guide for reciprocation instead of arcuate oscillation and a modified operative connection between the pickup head and its ram.

In the drawing (Fig. 20) a pickup head is shown at one station and a buff table beyond that station. The pickup head includes a head plate 210 and posts 211 secured to the head plate and slidable up and down in V grooves in fixed guides 212.

For each magazine outer ring compartment there are provided two pickup feet 213 similar to 75 to 79. The feet are carried by a plate 214 secured to a cross head 215. The latter carries spaced vertical rods 216, 217 slidably located in sleeves 218, 219 secured to 210. Collars 220, 221 pinned to the upper ends of 216 and 217 respectively are located on the ends of a cross head 222. This arrangement prevents rotation of 216.

The pickup head shown is designated specifically for the case when the inner "ring" of each buff layer is a complete single piece disc, i. e. the inner part of the magazine is a single cylindrical compartment. Two pairs of feet 223 are provided for picking up the central disc, one pair on either side of the buff table axis. The feet 223 are similar to 75 to 79. Means as shown in Figs. 1 and 8 but not shown in Fig. 20 are provided for supplying fresh surfaces of adhesive tape to 213 and 223 when required. Alternatively the feet 213 and 223 may be adhesive coated rods or they may be of the form shown in Figs. 9, 10 and 11. Each pair of feet 223 or all four, are secured to a rod 224 slidable in a sleeve 225 similar to 218. A collar 226 is secured to the upper end of 224. Means as at 217, 219, 221, 222 are provided for preventing rotation of 224.

A magazine 227 is slidably located, for ease of refilling or replacement, between rails 228 and a floor or base plate 229. The feet 213, 223 are shown in their lowest position i. e. when the magazine compartments are empty. The feet are biassed downwards by gravity or by springs (not shown) surrounding the rods, 216, 224 e. g. between the lower end of 218 and a boss 230 integral with 215.

A stripper plate grid 231, apertured as at 232 to permit the plates 233 carrying the feet 213, 223 to pass through it, is secured to rods 234, each slidable through the head 210 and a sleeve 234A and carrying an upper end stop 235. Springs (not shown) surround each rod 234 between 234A and 231. A catch rod 236 with an upper end cap 237 is secured to 231 and extends through an aperture 238 in 210 sufficiently large to permit 237 to pass through. The rods 234 and 236 are dimensioned so that the distance from a shoulder 239 on 237 to the catch surface 240 of a latch 241 similar to 66 is less than the distance from the underside of 235 to the upper end of 234A.

The pickup head is connected to its ram piston rod (not shown) by means of a yoke 242 spanning and connected to the head and a link 243 connected to the yoke centre at 244 and to an operating lever 245. The lever 245 is connected to the ram piston rod.

The rails 228, of which only one is shown, are spaced and parallel and are of V section to engage in spaced V grooves 246 under the buff table 247. The rails support the table during reciprocations between two magazine/pickup head stations.

Means as before are provided for raising and lowering the pickup head as required and moving the table between the stations.

In use, initially, the head is up, the feet 213, 223 are fully down, 239 is below 241 and 235 is against 234A.

Picking up from a half full magazine will be considered. On the pick up downstroke 231 engages the upper end 248 of the magazine. The springs around 234 are compressed. As downward movement continues the cap 237 rises past and above 241. The plates 233 and feet 213, 223 move through the apertures 232 in the stripper plate until the feet engage the top layer of cloth strips in the magazine. The head then moves down to its full extent, the rods 216, 217, 224 moving up relatively through their sleeves 218, 219, 225 respectively.

On the upward stroke, the head moves away from the feet, the latch 241 approaches 239, and the sleeves such as 218 approach the collars such as 220. When the sleeves and collars meet the feet are raised lifting the top layer of cloth. Before the top layer reaches the underside of 231, the latch 241 engages 237 and on further upward movement the stripper plate 231 rises with the head with the cloth layer below the stripper plate.

On the depositing downstroke, the top layer is deposited on the buff table, a circuit energised as before to withdraw the latch 241 from 237, the springs around 234 force 231 onto the top layer and the buff thickness gauge is operated. On the upstroke, the head moves up lifting the feet, and the top layer is stripped from the feet. When the sleeves 234A reach the caps 235, the stripper plate is lifted also. The plates 233 carrying the feet are dimensioned so that the feet can reach the bottom of a magazine when the head is fully down.

In yet another modification a battery of equally spaced stations is set up in line. Each comprises a lower magazine and an upper pickup head, the successive magazines along the line being of P type and Q type in turn. (This identification is used for convenience. All magazines are of the same diameter but the P type has a partition 127 of different radius from that of the partition 127 of the Q type). A battery of tables at the same spacing as the stations and located at a level between the magazines and the pickup heads is moved intermittently in one direction from station to station. Each table stops at a station and the pickup head deposits a buff layer on it. The tables then move on and, while they are between stations, each head picks up a layer from its magazine. To facilitate picking up the table may be stopped between stations as well as at stations.

Where fifty layer buffs are to be made, fifty such stations may be set up in each battery. Each table, as it stops at each station, has a layer deposited on it, type P and type Q in turn, so that when each table reaches the end of the battery it has a complete buff on it ready for removal and stitching.

Alternatively the spacing of the tables may be made twice that of the stations. The movement of the tables is made one station spacing at a time. Consequently, when stationary, adjacent tables are located respectively at alternate stations, e. g. both type P. A type P layer is deposited on each table and at the same time a type Q layer is picked up from each type Q magazine. At the end of the next movement of the tables, each is at a type Q station and a type Q layer, picked up when the tables were at P type stations, is deposited on each table.

In another important form of the invention, two similar transversely spaced uprights are connected at their upper ends by a bridge piece which carries a pneumatic cylinder in which slides a piston. The piston rod depends through the bridge and carries at its lower end a transverse crosshead slidably mounted at its sides in channelled guides in the respective uprights. Similar longitudinal end extensions of the crosshead carry respectively pick up heads of the general type shown in Fig. 20. A pair of transversely spaced longitudinal rails or supports are provided and are located at a level of the feet of the uprights. The rails slidably support a single flanged tray carrying a rotatable buff table or a series of spaced flanged trays, each carrying a rotatable buff table. In the former case means are provided for reciprocating the trays under and between each pick up head. In the latter case means are provided for intermittently moving the trays in one direction, a series of units in line, each having two pick up heads, being provided. In each case, means such as those shown in Figs. 3 and 4 are provided for rotating the buff table as required.

Longitudinally spaced magazines are located under the respective heads of each unit, one type P and the other type Q.

Each is adapted to be slid transversely of the unit when empty and replaced by a full magazine.

In a variation of this construction a central cylindrical pillar, part of which constitutes the pneumatic cylinder, is provided. The pillar below the lowermost position of the piston has formed through its wall two diametrally opposite similar slots parallel to the pillar axis. The length of each slot exceeds slightly the maximum piston displacement. The piston rod carries near its lower end a cross arm which projects through the slots and carries a short sleeve closely and slidably surrounding the pillar. The sleeve has circumferential end flanges so that a circumferential shallow U section channel is formed between the flanges. A second sleeve which is split is located in the channel around the first sleeve and provided with clamp means near the edges of the split so that it may be clamped to the first sleeve. The split sleeve has similar, diametrally opposite, external radial arms, each of which carries a pick up head.

The transversely spaced guide uprights are not required.

In use movement of the piston is transmitted by the piston rod, cross arm, inner sleeve and outer sleeve to the pick up heads.

When it is necessary to service the heads or replace adhesive tape, they may be turned through 90° by first unclamping the split sleeve from the inner sleeve.

The last, and in some respects, the most important form of the invention includes spaced parallel supports or rails to slidably support spaced trays carrying buff tables. One or more spaced stations are located along the rails. Each includes a fixed post on one side of the rails, an arm rotatably mounted at one end on the post near its upper end and extending at its other end over the rails, a pneumatic cylinder supported on and above the arm, a piston slidable in the cylinder, and a piston rod extending downwards through a bearing sleeve secured to the outer end of the arm and through the arm and carrying two pickup heads, preferably but not necessarily of the type shown in Fig. 20, spaced along the rails. The two heads will normally be located below the arm at opposite ends of a cross head carried by the piston rod. One head is adapted for example, to deal with cloth pieces from a P type magazine and the other with pieces from a Q type magazine. The piston is normally retained in the "up" position in the cylinder by means of a spring surrounding the rod and sleeve between a disc secured on the rod below the cylinder and the upper surface of the arm.

The main arm carrying the cylinder, piston, rod, sleeve crosshead and pick up heads will be normally retained in the operative position by a catch fixed on the post, engaging the arm and preventing rotation of the arm about the post. By releasing the catch from the arm, the latter and the components attached to it, may be rotated through 180° clear of the rails for inspection and maintenance. A transverse platform is located below the rails under each head and supports transversely spaced similar magazines, one under the head and one to one side. When one magazine is emptied it can be quickly removed for refilling and replaced by the other.

The arrangement described is particularly suitable for production line assembly of buffs. A number of two head units as described is set up in line, all associated with the same pair of rails, and spaced trays carrying buff tables are moved intermittently along the rails. Each table receives P and Q type layers alternately until a complete layer ready for stitching can be taken off each table, either at the end of the line or earlier, if the buff thickness, as tested by apparatus such as shown in Figs. 14 and 15 reaches the required value earlier.

In a long line of two-head units, e. g. twenty five, the rotation of a few heads out of the line for inspection or maintenance will not normally materially affect the thickness of the buff when it reaches the end of the line and will not interrupt the assembly of the buffs. Additional or auxiliary end stations may be provided if necessary to thicken buffs when an abnormal number of stations in the line are temporarily inoperative.

Means e. g. as in Figs. 3 and 4 may be provided if necessary for rotating the buff tables.

Figure 12:
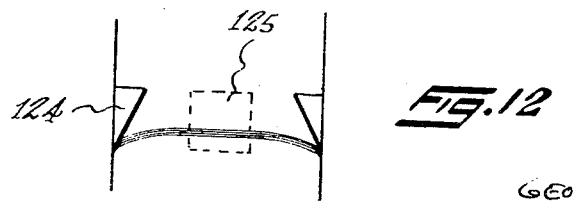
Fig. 12 is a view showing means for restricting upward movement of cloth strips in a magazine compartment.

When the form of pick up head shown in Fig. 20 is used, a modified form of the wedge construction of Fig. 12 is used. Each wedge is slidably mounted on a vertical rod or in a vertical groove in the relevant magazine wall. The pick up feet carry members, each adapted on the descent of the feet to engage and press down the wedges onto the top layers in the magazines so that the wedges closely engage the top layers irrespective of the number of layers previously withdrawn from the magazines.

The term "sector" where used in the specification and claims is intended to include such shapes as a surface or cloth strip bounded by two intersecting radii and a circular arc concentric with the radii and joining their outer ends, or a surface or strip bounded by two concentric circular arcs and two radii converging towards the centre of the arcs. It is also intended to include the cases where the lines joining the arcs are not converging and/or are not straight.

Each magazine will usually be of one piece open cylindrical form with cylindrical inner walls dividing the magazine into rings. The radial partitions may be fixed, so that only cloth sectors of a particular angle of conveyance may be used, or removable, so that sectors of varying angle may be used.

Instead of being in one piece, each magazine may comprise a number of component compartments secured together. The term "magazine" is intended to cover both the one piece and multipiece forms.

The rotation given to the buff table by mechanism such as is shown in Figs. 3 and 4 ensures that strips from a particular compartment which are relatively thicker than those in other compartments are distributed circumferentially in successive layers of a completed buff. This ensures that the buff thickness is substantially uniform.

The helical, spiral or stepped form of buff may be varied, by using a single sector shaped compartment of cloth, packing up and depositing repeatedly from that compartment and partly rotating the buff table between each depositing stroke of the pickup head so as to give the required overlap between successively deposited sectors. This arrangement produces a buff including a continuous spiral ring. The method described earlier produces a buff comprising several similar sections, each having a ring in the form of a continuous spiral.

An important form of buff constructed according to the invention, and by a machine according to the invention, is one comprising an inner buff ring adapted to be secured to a rotatable spindle and a replaceable outer buff ring adapted to be detachably secured to the inner ring and to be removed therefrom when worn and replaced by a new outer ring.

The inner ring is made up of a number of layers stitched together each comprising a number of sectors which are similar except that adjacent sectors are of different radii and alternate sectors are of the same radii. The outer edge of the inner ring is thus, in effect, provided with spaced longitudinal grooves parallel to the buff axis. The outer ring is similarly constructed so that the two rings may, in effect, be splined together.

The various buff layers are held between a pair of washers overlying the circumferential joint between the buff rings and between the usual leather or the like central discs.

The washers may be of fibre, leather, plastic, hard rubber or other suitable material. The first is of material such that one end of each of a series of locking pins may be bonded in it.

The pins are spaced around the washers. Each is flat, parallel to the buff axis, and secured at one end in the first washer. Each is located so that it may be readily forced between the buff rings and through a slot in the second washer. The pin near its free end is notched to receive a removable spring clip which bears against the outside of the second washer and secures it in position. When the outer ring becomes excessively worn it may readily replaced.

Alternatively the inner ring is reduced in external diameter at one end to form a flange, the outer ring is recessed, i. e. increased in internal diameter, at one end to receive the inner ring flange and the two rings are secured together by detachable spaced fastenings, e. g. screws or bolts, each passing through the inner ring flange and that part of the outer ring having the smaller internal diameter. Suitable washers are placed between the outer end of each fastening and the adjacent inner or outer ring end surface.

In a modified form of the construction, a fixed base block divided into segments, each located under a magazine compartment, is located under each magazine. Each compartment is adapted to fit closely over the corresponding block segment and may be vertically slidable relative to the other magazine compartments. Fixed wedges are secured inside each magazine compartment near its upper edge and engaging the top piece of cloth. At least one pick-up foot for each compartment carries a projecting member adapted, when the foot descends on its pick-up stroke, to engage and force down the corresponding magazine compartment over its base block segment. The pack of strips is compressed lightly between the base block and the wedges, thus ensuring good contact between the upper strip and the pick-up foot.

I claim:

1. A machine for assembling buffs comprising a magazine adapted to contain a packed series of layers of cloth, each layer adapted to form part at least of one layer of a complete buff, a table, adhesive means for removing successive layers from the magazine and depositing each layer so removed on the table on the previously deposited layer and means for partially rotating said table between successive layer depositions.

2. A machine for assembling buffs comprising at least two spaced magazines, each adapted to contain a packed series of layers of cloth, each layer adapted to form part at least of one layer of a complete buff, a table for receiving a partly assembled buff, adhesive means for removing a layer from each magazine in turn and subsequently depositing it on said partly assembled buff on the table and means for partially rotating said table between successive layer depositions.

3. A buff assembling machine comprising a substantially cylindrical magazine containing superimposed layers of cloth, each layer adapted to form part at least of one layer of a completed buff, a pick-up and depositing head located above the magazine and displaceable up and down, a table reciprocating approximately horizontally to and from between the magazine and the head, adhesive pick-up members on said head for contacting and picking up by adhesion part at least of the top layer in the magazine, means for successively lowering the head to pick up cloth from its associated magazine, lifting the head and the cloth, displacing the table to between the head and the magazine, lowering the head to deposit the cloth on the table, lifting the head and displacing the table from between the head and the magazine and means for partially rotating said table between successive layer depositions.

4. A machine as in claim 3 including means for stripping the cloth from the pick up machine at the beginning of the second upward movement of the pick-up and depositing cycle.

5. A buff assembling machine comprising a series of substantially cylindrical spaced magazines of substantially equal diameter, each adapted to contain superimposed layers of cloth, each layer adapted to form part at least of one layer of a completed buff, a pick-up and depositing head located above each magazine and displaceable up and down, a table adapted to be moved approximately horizontally to and fro between each magazine and its head, adhesive pick-up members on each head adapted when the head is moved down to contact and pick up by adhesion part at least of the top layer in the magazine, means for successively lowering each head to pick up cloth from its associated magazine, lifting the head and the cloth, displacing the table to between the head and the magazine, lowering the head to deposit the cloth on the table, lifting the head, and displacing the table from between the head and the magazine and means for partially rotating said table between successive layer depositions.

6. A machine as in claim 5 including means for stripping the cloth from the pick-up members at the beginning of the second upward movement of the pick-up and depositing cycle.

7. A buff assembling machine as in claim 5 wherein each magazine is divided into compartments by substantially radial partitions, each compartment has a sector angle which is substantially equal to or a multiple of the sector angle of the smallest compartment, each compartment is adapted to contain a pack of cloth strips fitting closely but displaceably therein and each buff layer comprises strips from at least one compartment.

8. A buff assembling machine as in claim 5 wherein each magazine is divided into at least two rings of compartments by circumferential partitions, each ring being divided into compartments by substantially radial partitions, each compartment has a sector angle which is substantially equal to or a multiple of the sector angle of the smallest compartment, each radial partition is displaced circumferentially relative to the adjacent radial partitions of the other rings, each compartment is adapted to contain a pack of cloth strips fitting closely but displaceably therein and each buff layer comprises strips from at least one compartment.

9. A buff assembling machine as in claim 5 wherein there are two magazines of substantially equal diameter, each is divided into an inner and an outer ring by a substantially cylindrical partition substantially coaxial with the cylinder, each ring is divided into compartments by substantially radial partitions, each compartment has a sector angle which is substantially equal to or a multiple of the sector angle of the smallest compartment, each partition of the inner ring is located between two adjacent partitions of the outer ring, the cylindrical partitions of the respective magazines are of different diameters, each compartment of each magazine is adapted to contain a pack of cloth strips fitting closely therein, and each buff layer comprises strips from at least one compartment of one magazine and the adjacent buff layer comprises strips from at least one compartment of the other magazine.

10. A buff assembling machine as in claim 9 including a ram located below each magazine and displaceable up and down and adapted when moved up to engage each cloth pack and displace it towards the pick up head and means for raising the corresponding packs against the head when the head is lowered on the first downward movement of the pick-up and depositing cycle and releasing the packs during the first upward movement of the cycle.

11. A buff assembling machine as in claim 9, wherein the pickup members are spaced feet, at least one to each magazine compartment and each carrying adhesive material, and the pick-up and depositing head includes also a stripper grid secured to the head and normally located below the feet and apertured to permit the feet to pass through it, the machine including means for stopping the stripper grid during the downward pickup movement of the head so that the feet pass through its apertures and for retaining the stripper grid above the feet and means for releasing the stripper grid on the downward depositing movement of the head to strip the cloth pieces from the feet.

12. A buff assembling machine as in claim 11 wherein the adhesive material is adhesive tape displaceably secured to the foot and means are provided for displacing the tape at intervals and while no cloth is adhering to it to bring a fresh tape surface into operative position.

13. A machine as in claim 5 including means for stopping the operation of the machine when any one magazine compartment becomes empty.

14. A machine as in claim 13 including means for gauging the buff thickness after the deposition of each layer.

15. A machine as in claim 14 including means for stopping the operation of the machine when the thickness of any buff reaches a predetermined value.

16. A buff assembling machine comprising a number of substantially equally spaced magazines in line, the magazines being substantially cylindrical and of substantially the same diameter, each magazine being divided into an inner and an outer ring by a circumferential partition, each ring being divided into compartments of substantially equal size and shape by partitions, each partition of the inner ring being located substantially midway between two adjacent partitions of the outer ring, the circumferential partitions of adjacent magazines being of different diameters and those of alternate magazines being of substantially the same diameter, each compartment of each magazine being adapted to contain a pack of cloth strips fitting closely therein, each buff layer comprising one strip from each compartment of one magazine, a pickup and depositing head located above each magazine and displaceable up and down, a series of spaced tables, means for moving the tables intermittently along the line of magazines in one direction so that they pass between each magazine and its adhesive pickup head in turn, pick-up members on each head adapted when the head is moved down to contact and pick up by adhesion part at least of the top layer in the associated magazine, means for successively lowering the heads simultaneously to pick up cloth from their respective associated magazines while each table is between a pair of adjacent units comprising a head and an associated magazine, lifting the heads and the cloth layers simultaneously, displacing the tables approximately horizontally so that each is between a head and its associated magazine, lowering the heads to deposit the layers on the respective tables, lifting the heads and displacing the tables to a position in which each is again between a pair of adjacent head and magazine units and means for partially rotating each table between successive layer depositions.

References Cited in the file of this patent
UNITED STATES PATENTS

| Number | Name | Date |
|---|---|---|
| 267,735 | Whittemore | Nov. 21, 1882 |
| 269,688 | Levett | Dec. 26, 1882 |
| 306,463 | Binns | Oct. 14, 1884 |
| 461,655 | Webster | Oct. 20, 1891 |
| 1,945,413 | Benge | Jan. 30, 1934 |
| 2,056,716 | Doyle | Oct. 6, 1936 |
| 2,091,990 | Jacobs | Sept. 7, 1937 |
| 2,093,640 | Millenaar | Sept. 21, 1937 |
| 2,295,073 | Blythe | Sept. 8, 1942 |
| 2,450,859 | Ogden | Oct. 5, 1948 |
| 2,522,092 | Churchill | Sept. 12, 1950 |
| 2,571,148 | Lyon | Oct. 16, 1951 |